US011502598B2

(12) United States Patent
Zhu et al.

(10) Patent No.: US 11,502,598 B2
(45) Date of Patent: Nov. 15, 2022

(54) STARTING CIRCUIT OF SWITCHING POWER SUPPLY

(71) Applicant: Globe (Jiangsu) Co., Ltd., Changzhou (CN)

(72) Inventors: Yanqiang Zhu, Changzhou (CN); Zhiyuan Li, Changzhou (CN)

(73) Assignee: Globe (Jiangsu) Co., Ltd., Changzhou (CN)

(*) Notice: Subject to any disclaimer, the term of this patent is extended or adjusted under 35 U.S.C. 154(b) by 0 days.

(21) Appl. No.: 17/368,831

(22) Filed: Jul. 7, 2021

(65) Prior Publication Data
US 2022/0021292 A1 Jan. 20, 2022

(30) Foreign Application Priority Data

Jul. 20, 2020 (CN) .......................... 202010701553.5
Jul. 20, 2020 (CN) .......................... 202021434855.2

(51) Int. Cl.
*H02M 1/36* (2007.01)
*H02M 1/00* (2006.01)
*H02J 7/00* (2006.01)
*H02M 3/335* (2006.01)

(52) U.S. Cl.
CPC ............. *H02M 1/36* (2013.01); *H02J 7/0047* (2013.01); *H02M 1/0032* (2021.05); *H02M 3/33523* (2013.01); *H02J 7/00306* (2020.01)

(58) Field of Classification Search
CPC .... H02M 1/0032; H02M 1/36; H02M 3/3352; H02J 7/00306; H02J 7/0047
USPC ....................................................... 363/21.15
See application file for complete search history.

(56) References Cited

U.S. PATENT DOCUMENTS

| 10,069,402 B2* | 9/2018 | Nakano | G03G 15/5004 |
| 2018/0269701 A1* | 9/2018 | Dai | H02M 3/33507 |
| 2020/0244176 A1* | 7/2020 | Gao | H05B 47/10 |

* cited by examiner

*Primary Examiner* — Yemane Mehari

(57) ABSTRACT

The disclosure provides a starting circuit of a switching power supply, which includes an input rectifying and filtering circuit, a starting circuit, a transformer, an output rectifying and filtering circuit, a feedback circuit, a first photoelectric coupler and a power management chip. The power management chip is respectively connected with the output end of the first photoelectric coupler, the output end of the feedback circuit and the primary coil of the transformer. After the first photoelectric coupler is powered on, the starting circuit is turned on, and the power management chip and the transformer are started and work. After the first photoelectric coupler is powered off, the power management chip stops working and enters a standby state. And at the moment, the standby power consumption of the power management chip is equal to zero.

10 Claims, 2 Drawing Sheets

STARTING CIRCUIT OF SWITCHING POWER SUPPLY

CROSS REFERENCE TO RELATED APPLICATION

The present application is based on, and claims the priority from, Chinese application number CN202010701553.5, filed on Jul. 20, 2020, the disclosure of which is hereby incorporated by reference herein in its entirety.

TECHNICAL FIELD

The disclosure relates to a starting circuit of a switching power supply, belonging to the technical field of power supply.

BACKGROUND

In a conventional switching power supply, after the switching power supply is started, there is a certain power loss in the no-load mode. In the current market, there lacks a power supply that having only a few milliwatts no-load power consumption and reaching several Watts output power. Precision theoretical calculations and a large number of actual detections prove that the no-load power consumption of a switching power cannot be reduced to several milliwatts mainly with three reasons: first, the use of a power management chip with a larger self power consumption; second, that the semiconductor element works in a state provided with static current; and third, the power consumption of the starting resistor being too large.

In addition, in the conventional switching power supply, if without other auxiliary power circuits, there is no way to directly turn off the VCC power supply of the master control chip after the product is used.

In view of the above, it is necessary to improve the existing starting circuit of a switching power supply to solve the problems mentioned above.

BRIEF DESCRIPTION OF THE DISCLOSURE

The disclosure aims to provide a starting circuit of a switching power supply that can really achieve zero or near zero power consumption in a standby mode.

The disclosure provides a starting circuit of a switching power supply which includes: an input rectifying and filtering circuit which have an input end being connected with an AC power supply; a starting circuit which have an input end being connected with an output end of the input rectifying and filtering circuit; a transformer, including: a primary coil, a secondary coil and a feedback coil, wherein the primary coil is arranged on one side of the transformer and connected with the output end of the input rectifying and filtering circuit, and the secondary coil is arranged on the other side of the transformer; an output rectifying and filtering circuit which have an input end being connected to the secondary coil of the transformer; a feedback circuit which have an input end being connected with the feedback coil and the input end further being connected with an output end of the output rectifying and filtering circuit; a first photoelectric coupler which is connected with an output end of the starting circuit and an external battery respectively; and a power management chip which is respectively connected with an output end of the first photoelectric coupler, an output end of the feedback circuit, and the primary coil of the transformer; after the first photoelectric coupler is powered on, the starting circuit is turned on, and the power management chip and the transformer are started and work; after the first photoelectric coupler is powered off, the power management chip stops working and enters a standby state, and at the moment, the standby power consumption of the power management chip is equal to zero.

As a further improvement of the disclosure, the first photoelectric coupler includes: a first light emitting source which is connected with the positive electrode of external battery; and a first light receiver, one end of which is connected with the output end of the starting circuit, and the other end of which is connected with the power management chip; wherein after the first light emitting source is powered on, the first light receiver output a voltage to make the starting circuit and the power management chip turn-on.

As a further improvement of the disclosure, the starting circuit includes at least one starting resistor which is connected between the output end of the input rectifying and filtering circuit and the first light receiver.

As a further improvement of the disclosure, the output rectifying and filtering circuit includes: a diode which is connected with the secondary coil of the transformer; and an output filter capacitor, wherein the diode is connected in series with the secondary coil, and the output filter capacitor is connected in parallel with the secondary coil.

As a further improvement of the disclosure, the feedback circuit includes: a direct current negative feedback resistor, one end of which is connected with the feedback coil, and the other end of which is connected with the power management chip, wherein the direct current negative feedback resistor is connected with the CS pin of the power management chip; and a reverse cut-off rectifier tube, one end of which is connected with the feedback coil, and the other end of which is connected with the first photoelectric coupler.

As a further improvement of the disclosure, the starting circuit of the switching power supply further includes: a switching element which is connected between the power management chip and the transformer, and the switching element is used for controlling the transformer to start or turn off according to a control signal which is outputted by the power management chip.

As a further improvement of the disclosure, the switching element is a field effect transistor; the field effect transistor comprises a gate electrode which is connected with a Gate pin of the power management chip, a drain electrode which is connected with a primary coil of the transformer, and a source electrode which is grounded; wherein a parasitic diode is connected between the source electrode and the drain electrode, and the parasitic diode unidirectionally turns on along the direction from the source electrode to the drain electrode.

As a further improvement of the disclosure, the starting circuit of the switching power supply further includes: a battery detection circuit which includes: a voltage stabilizing tube which is connected with the output rectifying and filtering circuit, a fourth resistor which is connected in series with the voltage stabilizing tube, and a second photoelectric coupler which is connected in series with the fourth resistor, wherein the second photoelectric coupler includes a second light emitting source and a second light receiver, wherein the second light emitting source is connected with the fourth resistor, and the second light receiver is connected with the power management chip.

As a further improvement of the disclosure, one end of the second light receiver is connected with the FB pin of the power management chip, and the other end is grounded.

As a further improvement of the disclosure, the power management chip is further provided with an RT pin, and the RT pin is grounded through a timing resistor.

The disclosure has the beneficial effects below: the first photoelectric coupler is used for driving the power management chip to start or stop. After the first photoelectric coupler is powered on, the starting circuit turns on, then the power management chip and the transformer are started to work. After the first photoelectric coupler is powered off, the power management chip stops working and enters a standby state. At this moment, the standby power consumption of the power management chip is equal to zero. Compared with the prior art, the starting circuit of the switching power supply as disclosed can really achieve zero power consumption in a standby mode.

DETAILED DESCRIPTION

To make the objects, technical solutions and advantages of the disclosure clearer, the drawings combined with embodiments will be described below in detail.

Figure 1:
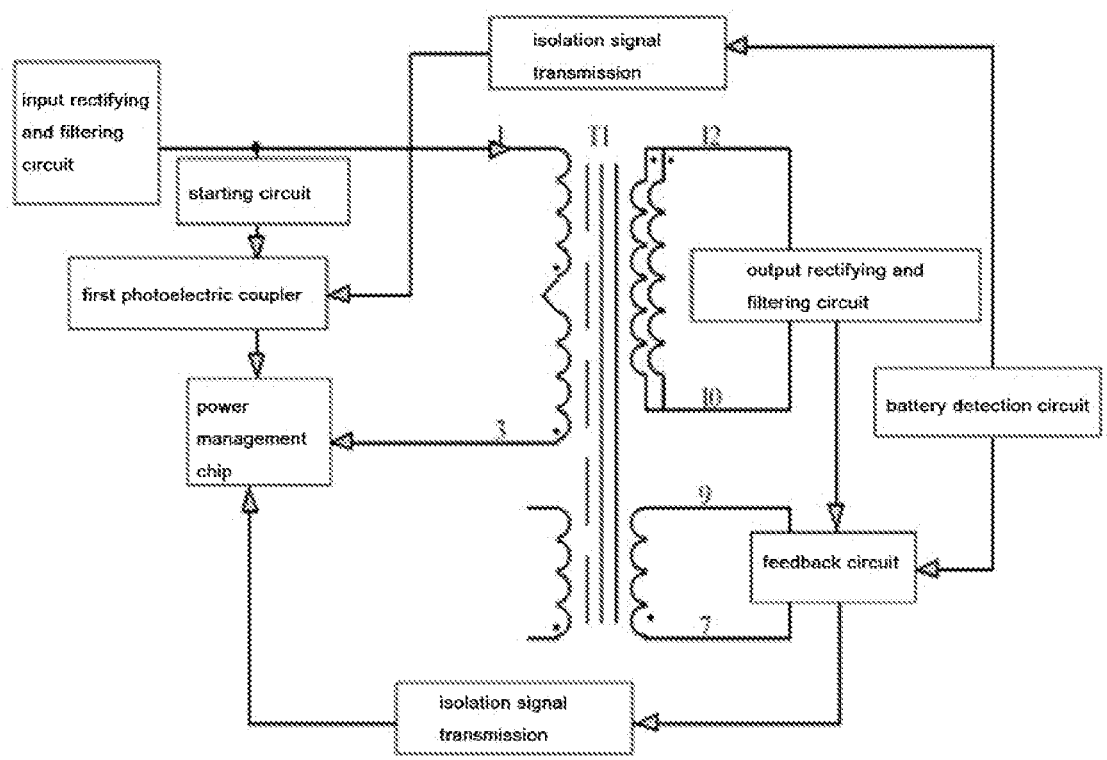
FIG. 1 is a block diagram of a starting circuit of a switching power supply of the disclosure.
Figure 2:
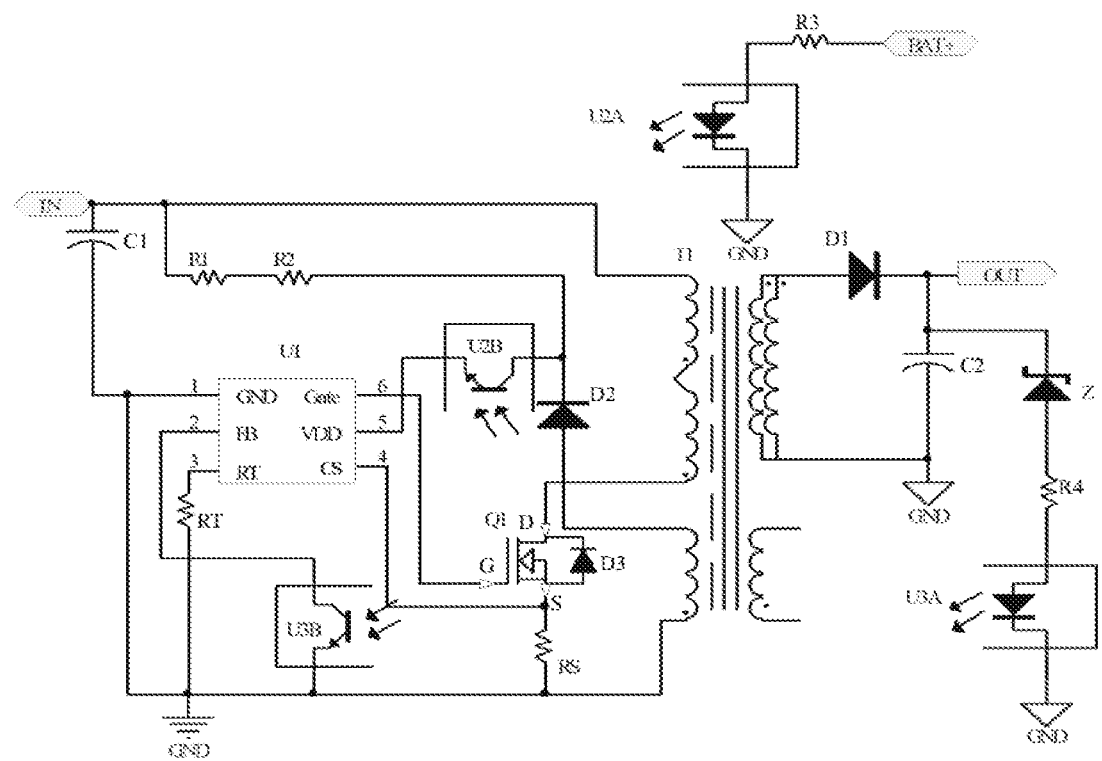
FIG. 2 is a circuit diagram of the starting circuit of the switching power supply of the disclosure.

As shown in FIG. 1 and FIG. 2, the disclosure discloses a starting circuit of a switching power supply which may include an input rectifying and filtering circuit, a starting circuit, a transformer T1, an output rectifying and filtering circuit, a feedback circuit, a first photoelectric coupler (U2A, U2B), a power management chip and a battery detection circuit. The starting circuit of the switching power supply may be mainly used for charging a small power product such as a mobile phone and the like.

The input end of the input rectifying and filtering circuit may be connected with the AC mains Supply IN, and used for rectifying and filtering the power frequency mains supply into a pulsed direct current. In this embodiment, the input rectifying and filtering circuit may mainly include a filter capacitor C1. One end of the filter capacitor C1 may be connected with the AC mains supply IN, and the other end of the filter capacitor C1 may be connected with the GND pin (ground) of the power management chip U1. Certainly, in other embodiments, bridge circuits may also be added as desired, without limited herein.

The input end of the starting circuit may be connected with the output end of the input rectifying and filtering circuit, and mainly used for providing a starting current for the power management chip U1. In general, the starting circuit may be composed of a plurality of high resistance resistors in series. In the embodiment, the starting circuit may include a first starting resistor R1 and a second starting resistor R2 which may be connected with the output end of the input rectifying and filtering circuit.

The transformer T1 may include a primary coil, a secondary coil and a feedback coil. The primary coil may be arranged on one side of the transformer T1, and the secondary coil may be arranged on the other side of the transformer T1. The primary coil may be connected with the output end of the input rectifying and filtering circuit, and be used for safe electrical isolation between the output end of the power and the mains supply, and also plays a role of electric energy transmission, voltage distribution and feedback voltage production.

The input end of the output rectifying and filtering circuit may be connected with the secondary coil, and be used for rectifying and filtering the high-frequency current which is outputted by the secondary coil of the transformer T1, and output a stable direct current to a load (such as a mobile phone). In the embodiment, the output rectifying and filtering circuit may include a diode D1 and an output filter capacitor C2 which are connected with the secondary coil of the transformer T1. The diode D1 may be connected in series with the secondary coil. And the output filter capacitor C2 may be connected in parallel with the secondary coil and be grounded.

The input end of the feedback circuit may be connected with the feedback coil, and the may input end of the feedback circuit maybe connected with the output end of the output rectifying and filtering circuit, and the feedback circuit is mainly used for transmitting the received feedback signal to the power management chip U1, and then being controlled to turn on or turn off the whole starting circuit of the switching power supply by the power management chip U1. In this embodiment, the feedback circuit may include a direct current negative feedback resistor Rs and a reverse cut-off rectifier tube D2. One end of the direct current negative feedback resistor Rs may be connected with the feedback coil and the other end may be connected with the power management chip U1. One end of the reverse cut-off rectifier tube D2 may be connected with the feedback coil, and the other end may be connected with the first photoelectric coupler. The direct current negative feedback resistor Rs may be connected with the CS pin of the power management chip U1, and used for feeding back the detected current signal to the power management chip U1.

The first photoelectric coupler may respectively be connected with an output end of the starting circuit and an external battery. The power management chip U1 may respectively be connected with the output end of the first photoelectric coupler, the output end of the feedback circuit and the primary coil of the transformer T1. After the first photoelectric coupler is powered on, the starting circuit is turned on, and the power management chip U1 and the transformer T1 is start to work normally. After the first photoelectric coupler is powered off, the power management chip U1 stops working and enters a standby state. At this moment, the standby power consumption of the power management chip U1 is equal or substantially equal to zero.

In particular, the first photoelectric coupler may include a first light emitting source U2A and a first light receiver U2B. One end of the light emitting source U2A may be connected with the positive electrode of the external battery BAT+. One end of the first light receiver U2B may be connected with the output end of the starting circuit, and the other end may be connected with the VDD pin of the power management chip U1. So that after the first light emitting source U2A is powered on, the first light receiver U2B outputs a voltage to turn on the starting circuit and the power management chip U1. Preferably, the first starting resistor R1 and the second starting resistor R2 may be connected between the output end of the input rectifying and filtering circuit and the first light receiver U2B, the reverse cut-off rectifier tube D2 may be connected with the first light receiver U2B, a resistor R3 may also be connected between one end of the first light emitting source U2A and the positive electrode of the external battery BAT+, and the other end of the first light emitting source U2A is grounded.

The power management chip U1 may be further provided with an RT pin. The RT pin is grounded through a timing resistor RT.

The starting circuit of the switching power supply may further include a switching element Q1 which may be connected between the power management chip U1 and the transformer T1. And the switching element Q1 may be used for controlling the transformer T1 to start or shut off according to a control signal which is outputted by the power management chip U1. In particular, the switching element Q1 may be a field effect transistor (MOS tube). A gate electrode (G pole) of the field effect transistor Q1 may be connected with the Gate pin of the power management chip U1, and a drain electrode (D pole) may be connected with the primary coil of the transformer T1, a source electrode (S pole) may be grounded. A parasitic diode D3 may also be connected between the source electrode (S pole) and the drain electrode (D pole) of the field effect transistor Q1, and the parasitic diode D3 may unidirectionally be turned on along the direction from the source electrode (S pole) to the drain electrode (D pole).

The starting circuit of the switching power supply may further include a battery detection circuit, which may mainly be used for detecting the output voltage of the battery and transmitting the detected voltage value and the isolation signal to the power management chip U1. The battery detection circuit may include a voltage stabilizing tube Z which is connected with the output rectifying and filtering circuit, a fourth resistor R4 in series with the voltage stabilizing tube Z, and a second photoelectric coupler (U3A, U3B) in series with the fourth resistor R4. The second photoelectric coupler may include a second light emitting source U3A and a second light receiver U3B. And the second light emitting source U3A may be connected with the fourth resistor R4. The second light receiver U3B may be connected with the power management chip U1. Preferably, the second light source U3A may be connected in parallel with the output filter capacitor C2 by the voltage stabilizing tube Z and the fourth resistor R4. One end of the second light receiver U3B may be connected with the FB pin of the power management chip U1, and the other end is grounded, so as to transmit the detected battery voltage value to the power management chip U1.

The battery detection circuit is arranged that not only a corresponding battery product can intelligently be charged by the charger to reduce the probability of misuse, but also, without using MCU and telecommunication, the battery detection circuit can recognize whether the battery is over discharged. If the battery is over discharged, the charger will not charge the battery, so as to play a role of security protection in a certain extent.

When a battery or other external power supply is accessed to the starting circuit of the switching power supply as disclosed herein, a voltage higher than 22 V is applied across BAT+and GND (this is illustrated as an example with the lowest voltage 22V, and the circuit of the disclosure can work at any voltage higher than 2.5V). At this moment, after the voltage passes through the resistor R3, the first photoelectric coupler is powered on, and the first light emitting source U2A is started to work. And the internal light emitting tube emits light so that the first light receiver U2B is turned on. Then the first starting resistor R1 and the second starting resistor R2 access to the circuit, so that the starting circuit is turned on. The VDD pin of the power management chip U1 gets an original starting voltage and starts to work. After that, the power management chip U1 outputs a control signal to the field effect transistor Q1 through the Gate pin, controlling the field effect transistor Q1 to turn on so that the transformer T1 starts to work. And the output rectifying and filtering circuit outputs a voltage for charging.

When the starting circuit of the switching power supply works normally, the battery detection circuit detects the output voltage value of the battery in real time to control the transformer T1 to start or shut off in real time according to the detected voltage value. That is, when the battery detection circuit detects that there is a normal output voltage at the output rectifying and filtering circuit, an isolation signal is transmitted to the power management chip U1 and the feedback circuit. Then the power management chip U1 controls the transformer T1 to normally turn on and continue to supply power. When the battery detection circuit detects that there is no output voltage at the output rectifying and filtering circuit, an isolation signal is transmitted to the power management chip U1 and the feedback circuit. At this moment, the power management chip U1 shuts off the field effect transistor Q1 so that the transformer T1 stops working, and the whole starting circuit of the switching power supply enters a standby state (that is, a closed state) to play a role of security protection in a certain extent.

Of course, when the battery or other external power source is removed, the electrical level of BTA+and GND disappear. The first photoelectric coupler stops working. The first light emitting source U2A stops emitting light, and the first light receiver U2B is turned off. The VDD pin of the power management chip U1 is completely shut off so that the power management chip U1 is powered down and stops working. At this moment, the whole starting circuit of the switching power supply enters a closed state (that is, a standby state). All the chips in the control circuit stop working (non-sleep mode), at which time the power consumption of the starting circuit of the switching power supply is zero.

In summary, the starting circuit of the switching power supply of the disclosure drives the power management chip U1 to turn on or turn off by the first photoelectric coupler (U2A, U2B). After the first photoelectric coupler (U2A, U2B) is powered on, the starting circuit is turned on, and the power management chip U1 and the transformer T1 is started to work. After the first photoelectric coupler (U2A, U2B) is powered off, the power management chip U1 stops working and enters a standby state, and at which time the standby power consumption of the power management chip U1 is equal to zero.

Compared with the prior art, the starting circuit of the switching power supply can really realize zero power consumption in a standby mode, and reduce unnecessary waste of resource. In addition, the disclosure can well solve the problem of standby power consumption of the charger without load. Meanwhile, the disclosure may also effectively prevent the charger from the reduction of the service life in a standby mode, when the charger keeps being powered on for a long time but not in use. The service life of the product may be prolonged, and the safety and the working reliability of the product are effectively improved.

While the disclosure has been described in detail regarding preferred embodiments, those skilled in the art can easily understand other advantages and effects of the disclosure from the content disclosed in this specification. The disclosure can be implemented or applied through other different specific embodiments, and various details in the specification can be modified or changed based on different viewpoints and applications without departing from the spirit of the disclosure.

What is claimed is:

1. A starting circuit of a switching power supply, comprising:
   an input rectifying and filtering circuit, having an input end being connected with an AC power supply;
   a starting circuit, having an input end being connected with an output end of the input rectifying and filtering circuit;
   a transformer, comprising:
      a primary coil, a secondary coil and a feedback coil, wherein
      the primary coil is arranged on one side of the transformer and connected with the output end of the input rectifying and filtering circuit, and the secondary coil is arranged on the other side of the transformer;
   an output rectifying and filtering circuit, having an input end being connected to the secondary coil of the transformer;
   a feedback circuit, having an input end being connected with the feedback coil and the input end further being connected with an output end of the output rectifying and filtering circuit;
   a first photoelectric coupler, connected with an output end of the starting circuit and an external battery respectively; and
   a power management chip, respectively connected with an output end of the first photoelectric coupler, an output end of the feedback circuit, and the primary coil of the transformer; wherein
      after the first photoelectric coupler is powered on, the starting circuit is turned on, and the power management chip and the transformer are started and operational, and
      after the first photoelectric coupler is powered off, the power management chip enters a standby state, and the standby power consumption of the power management chip is substantially equal to zero.

2. The starting circuit of the switching power supply as claimed in claim 1, wherein
   the first photoelectric coupler comprises:
      a first light emitting source, connected with a positive electrode of the external battery; and
      a first light receiver, one end of which is connected with the output end of the starting circuit, and the other end of which is connected with
      the power management chip; wherein
         after the first light emitting source is powered on, the first light receiver output a voltage to turn-on the starting circuit and the power management chip.

3. The starting circuit of the switching power supply as claimed in claim 2, wherein
   the starting circuit comprises at least one starting resistor which is connected between the output end of the input rectifying and filtering circuit and the first light receiver.

4. The starting circuit of the switching power supply as claimed in claim 1, wherein
   the output rectifying and filtering circuit comprises:
      a diode, connected in series with the secondary coil of the transformer; and
      an output filter capacitor, connected in parallel with the secondary coil.

5. The starting circuit of the switching power supply as claimed in claim 1, wherein
   the feedback circuit comprises:
      a direct current negative feedback resistor, one end of which is connected with the feedback coil, and the other end of which is connected with the power management chip, wherein
         the direct current negative feedback resistor is connected with the CS pin of the power management chip; and
      a reverse cut-off rectifier tube, one end of which is connected with the feedback coil, and the other end of which is connected with the first photoelectric coupler.

6. The starting circuit of the switching power supply as claimed in claim 1, further comprising:
   a switching element, connected between the power management chip and the transformer, wherein
      the switching element is used for controlling the transformer to start or turn off according to a control signal which is outputted by the power management chip.

7. The starting circuit of the switching power supply as claimed in claim 6, wherein
   the switching element is a field effect transistor, the field effect transistor comprising:
      a gate electrode, connected with a gate pin of the power management chip,
      a drain electrode, connected with the primary coil of the transformer, and
      a source electrode, grounded, wherein
         a parasitic diode is connected between the source electrode and the drain electrode, and
            the parasitic diode unidirectionally turns on along the direction from the source electrode to the drain electrode.

8. The starting circuit of the switching power supply as claimed in claim 1, further comprising:
   a battery detection circuit, comprising:
      a voltage stabilizing tube, connected with the output rectifying and filtering circuit,
      a fourth resistor, connected in series with the voltage stabilizing tube, and
      a second photoelectric coupler, connected in series with the fourth resistor, wherein the second photoelectric coupler comprises
         a second light emitting source, connected with the fourth resistor, and
         a second light receiver, connected with the power management chip.

9. The starting circuit of the switching power supply as claimed in claim 8, wherein
   one end of the second light receiver is connected with the FB pin of the power management chip, and the other end is grounded.

10. The starting circuit of the switching power supply as claimed in claim 1, wherein
    the power management chip is further provided with an RT pin, and the RT pin is grounded through a timing resistor.

* * * * *